UNITED STATES PATENT OFFICE.

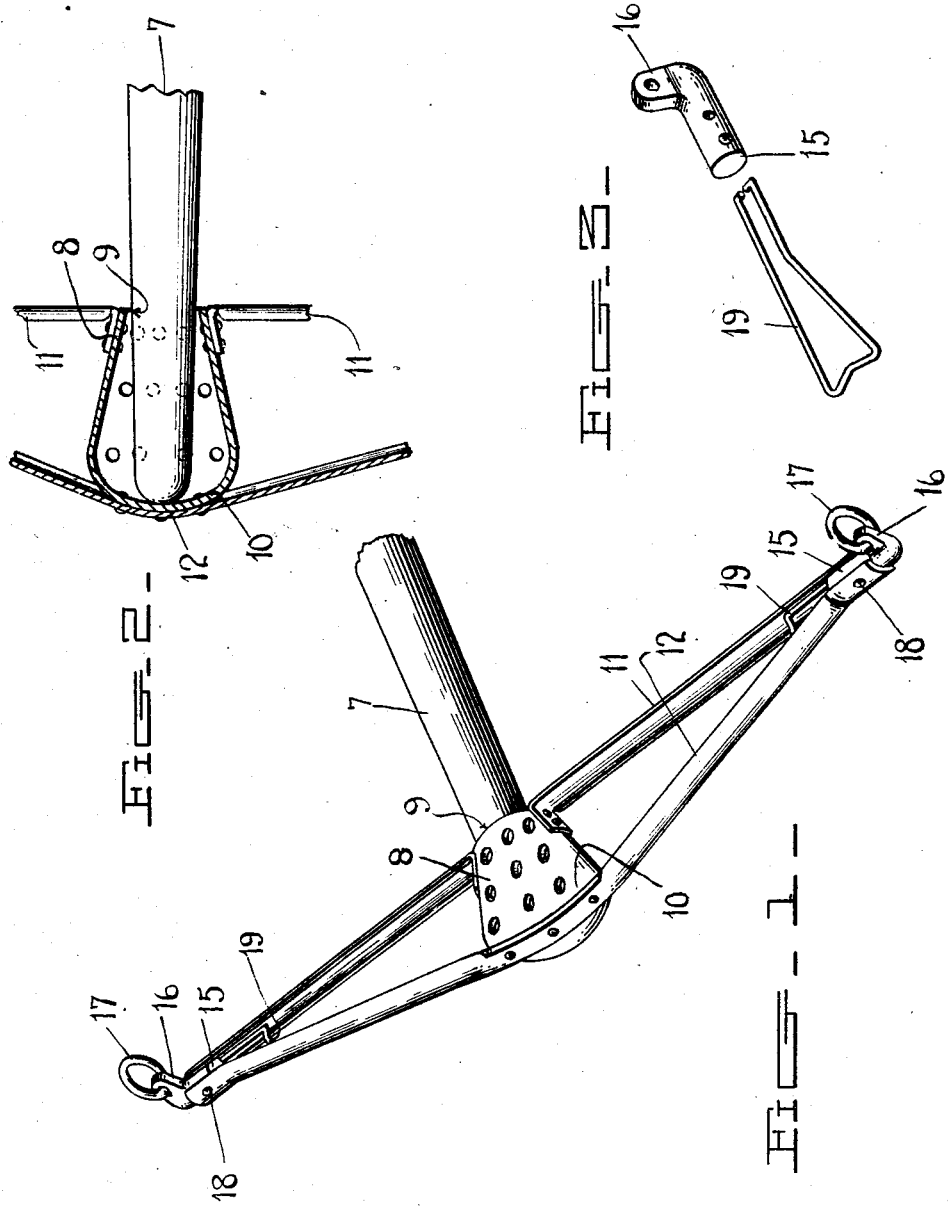

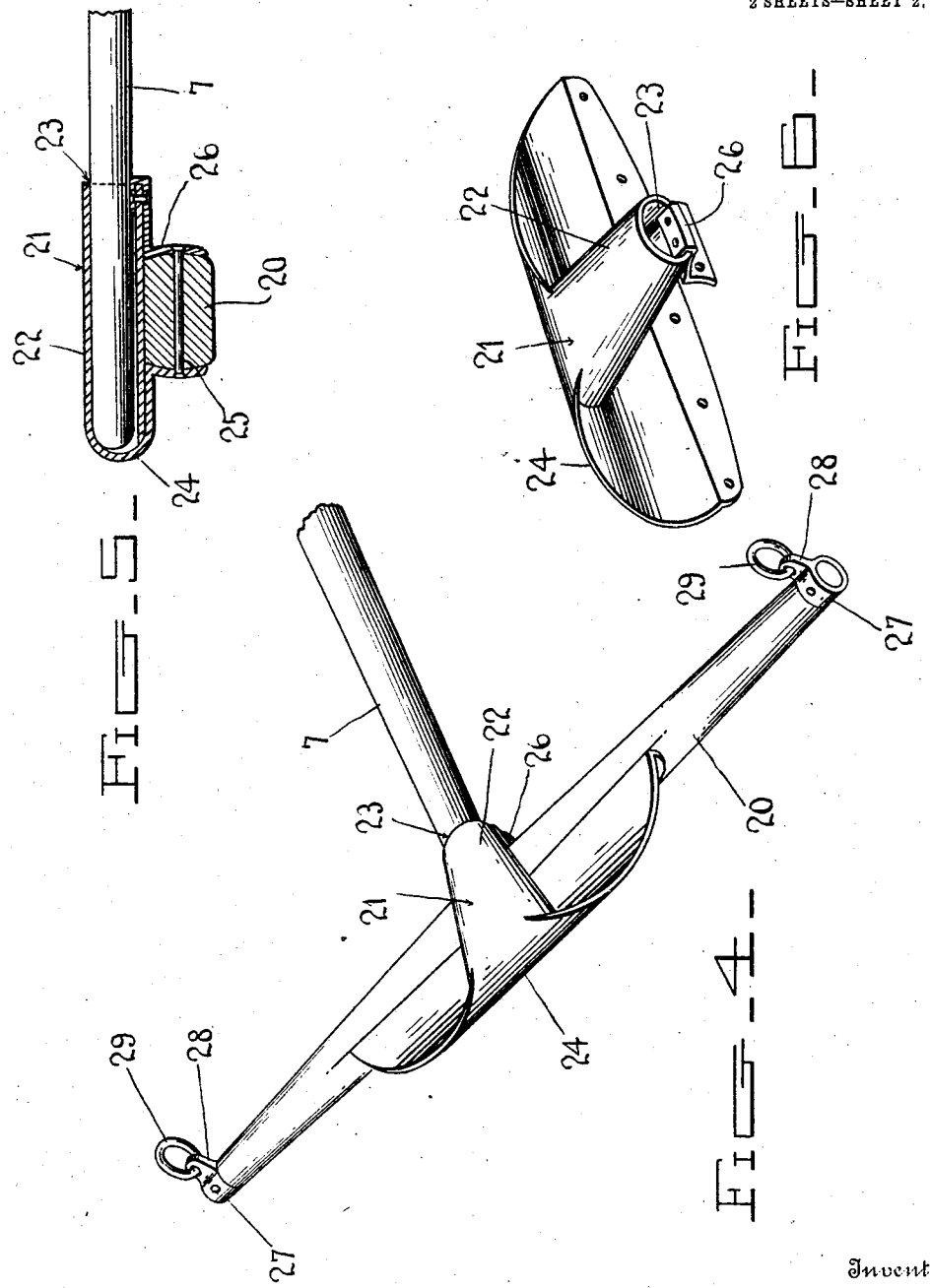

JOHN N. NOVOTNY, OF BADGER, MINNESOTA.

NECK-YOKE.

968,393. Specification of Letters Patent. Patented Aug. 23, 1910.

Application filed December 23, 1909. Serial No. 534,662.

*To all whom it may concern:*

Be it known that I, JOHN N. NOVOTNY, a citizen of the United States, residing at Badger, in the county of Roseau, State of Minnesota, have invented certain new and useful Improvements in Neck-Yokes; and I do hereby declare the following to be a full, clear, and exact description of the invention, such as will enable others skilled in the art to which it appertains to make and use the same.

The invention relates to neck yokes and more particularly to the class of detachable neck yokes for use with the poles of vehicles, agricultural machines or the like.

The primary object of the invention is the provision of a neck yoke in which the end of a pole of a vehicle is concealed so as to render it impossible for the lines or reins of the draft animals to become engaged or caught by the end of the pole, thus removing the cause of annoyance and minimizing the chances of accidents from such cause.

Another object of the invention is the provision of a neck yoke of this character which is adapted to be detachably connected to the end of the pole of a vehicle and that will be permitted to turn in a back and forth direction or rotate upon the pole and also that will overcome the requirement of fasteners to connect the neck yoke to the pole which have been heretofore employed for this purpose.

A still further object of the invention is the provision of a neck yoke which is simple in construction, extremely durable and which may be economically manufactured.

In the drawings accompanying and forming part of this specification is illustrated the preferred forms of embodiment of the invention, which to enable those skilled in the art to practice the invention, will be set forth at length in the following detail description, while the novelty of the invention will be pointed out in the claims hereunto appended.

In the drawings:—Figure 1 is a fragmentary perspective view of a draft pole with one form of the invention applied thereto. Fig. 2 is a transverse horizontal sectional view thereof. Fig. 3 is a detail perspective view of one terminal member and brace clip detached therefrom. Fig. 4 is a fragmentary perspective view with a modified form of the invention applied thereto. Fig. 5 is a vertical transverse sectional view through the same. Fig. 6 is a perspective elevation of the socket member detached from the cross beam or bar.

Similar reference characters indicate corresponding parts throughout the several views in the drawings.

Referring to the drawings by numerals 7 designates the forward end portion of a draft pole which is of the usual well known construction and to which is adapted to be connected a neck yoke as will be hereinafter more fully described.

The neck yoke comprises a hollow body or shell forming a socket member 8, the same being rearwardly tapered to provide a contracted open end 9, forming an entrance mouth and an opposite closed end 10, and suitably secured exteriorly of the shell at its open end 9, are laterally extending bars 11, each of which is of substantially semi-circular-shape in cross section throughout its length and secured to the opposite closed end 10, of this shell is a bowed brace bar 12, the latter being substantially semi-circular-shape in cross section throughout its length. Interposed between the outer extremities of the bars 11 and 12 are the tubular portions of ears 16, the said ears being provided with suitable apertures in which are engaged rings 17, with which neck yokes are ordinarily provided. The tubular portions 15 in the ears 16, are secured to the outer extremities of the bars 11 and 12, by means of fasteners 18 and engaging in these tubular portions 15 are the leg portions of staple shaped members 19, the same being adapted to form brace bridges between the bars 11 and 12 and also serving as holding devices for the ears 16 when outward lateral strain is applied thereto.

It is obvious that due to the peculiar shape of the shell 8, the free end of the pole 7, when engaging in the shell 9, will not interfere with a turning movement of the neck yoke in a back-and-forth direction or in an up-and-down direction.

In Figs. 4, 5, and 6 in the drawings is shown a modification of a neck yoke wherein the same comprises a cross beam 20, upon which is centrally mounted a socket member 21, formed from a single piece of material bent to provide a shell 22, the same being rearwardly tapered to provide a contracted open end 23, while the opposite end of this shell is closed by a forwardly and downwardly curved plate 24, the later serving as a front brace member and is connected along its longitudinal free edge to the beam 20, by fasteners 25.

The open contracted end 23, of the shell 22, has connected thereto a rear brace member 26, the same being also connected to the cross beam 20, by means of the fasteners 25, so that in this manner the socket member has its opposite ends connected to the cross beam of the neck yoke. Secured to opposite ends of the cross beam 20, are collars 27, the same being formed with perforated ears 28 carrying rings 29, with which neck yokes are ordinarily provided and serve as collar strap engaging means.

It is to be understood that slight changes, variations, and modifications may be made in the structures such as come properly within the scope of the appended claims without departing from the spirit of the invention or sacrificing any of its advantages.

What is claimed is:—

1. The herein described neck yoke comprising a socket member having a socket gradually increasing from one end to the other of said member, the smaller end of the member being opened to receive the free terminal of a draft pole, and collar strap engaging means spaced from the said member at opposite sides thereof and having rigid connection therewith.

2. A neck yoke comprising a pole receiving member having a socket therein, the same gradually increasing in area from the rear end of the member from the inner end to the outer end of the member, the inner end of the member being opened for receiving a draft pole, collar strap engaging elements and rigid brace members extending from the closed and opened ends respectively of the said first named member and having rigid connection with the said collar strap engaging elements.

In testimony whereof, I affix my signature, in presence of two witnesses.

JOHN N. NOVOTNY.

Witnesses:
G. I. BRANDR,
JOSEPH NOVOTNY.